United States Patent Office 3,709,922
Patented Jan. 9, 1973

3,709,922
O-LOWER ALKANOYL OXIMES OF CYANOACETALDEHYDE
Willy Leimgruber, Montclair, and Manfred Weigele, North Caldwell, N.J., assignors to Hoffmann-La Roche Inc., Nutley, N.J.
No Drawing. Filed June 1, 1970, Ser. No. 42,545
Int. Cl. C07c *121/30*
U.S. Cl. 260—465.4    5 Claims

ABSTRACT OF THE DISCLOSURE

This invention is directed to a process for the preparation of maononitrile and cyanoacetamide from the reaction product of a dialkyl acetal of a dialkyl formamide and acetonitrile including intermediates therein.

BACKGROUND OF THE INVENTION

Malononitrile has been prepared commercially from cyanoacetamide through the dehydration of cyanoacetamide with phosphorus pentoxide. This process suffers from the disadvantage that cyanoacetamide has been a difficult material to synthesize economically. Generally, cyanoacetamide is synthesized from α-chloroacetic acid in four steps. The use of a four-step synthesis provides obvious drawbacks as far as yields and economics are concerned. Therefore, it has long been desired to provide a simple and economic means to synthesize both malononitrile and cyanoacetamide from inexpensive and readily available starting materials.

SUMMARY OF THE INVENTION

In accordance with this invention, it has been found that cyanoacetamide which has the formula:

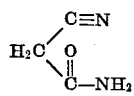

I can be simply and economically synthesized from a compound of the formula:

$$R_1-N-CH=CH-CN$$
$$\phantom{R_1-N}|\phantom{-CH=CH-CN}$$
$$\phantom{R_1-N}R_2$$

II wherein $R_1$ and $R_2$ are lower alkyl.

Furthermore, this invention provides a simple and direct means for producing malononitrile which has the formula:

III directly from the compound of Formula II above.

The compound of Formula II can be easily synthesized from readily available and commercially economical materials by two methods. In the first method of producing the comopund of Formula II above, an acetal of the formula:

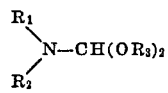

IV wherein $R_1$ and $R_2$ are as above; and $R_3$ is lower alkyl; is condensed at a temperature of at least 80° C. with acetonitrile. In accordance with the second method of producing the compound of Formula II above, a compound of the formula:

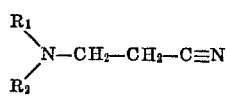

V wherein $R_1$ and $R_2$ are as above;
is treated with a hydrogen acceptor at a temperature of at least 50° C. in the persence of a dehydrogenation catalyst.

DETAILED DESCRIPTION

As used throughout the specification, the term "lower alkyl" includes both straight and branched chain alkyl groups containing from 1 to 6 carbon atoms such as methyl, ethyl, propyl, isopropyl, and the like. As used throughout the specification, the term "lower alkanoyl" includes alkanoyl groups containing from 2 to 6 carbon atoms such as acetyl, propionyl and butyryl. The term "alkali metal" includes such metals as sodium, potassium and lithium.

The reaction of acetonitrile with the acetal of Formula IV to form the compound of Formula II is carried out at a temperature of at least 80° C. Generally, it is preferred to utilize a temperature of from 100° C. to 250° C. in carrying out this reaction. While this reaction can be carried out at atmospheric pressure, superatmospheric pressures are utilized when higher temperatures are utilized. This reaction can be carried out without the need for utilizing any solvent. However, if desired, an inert organic solvent can be utilized. Any conventional inert organic solvent such as benzene, toluene, methylene chloride, can, if desired, be utilized in carrying out this reaction.

The second method of preparing the compound of Formula II above is by treating a compound of Formula V above with a hydrogen acceptor at a temperature of at least 50° C. in the presence of a dehydrogenation catalyst. Any conventional dehydrogenation catalyst can be utilized in carrying out this reaction. Among the preferred dehydrogenation catalysts which can be utilized in this reaction are palladium, Raney nickel and cupric chromite. In carrying out this reaction, any conventional hydrogen acceptor can be utilized. Among the preferred hydrogen acceptors is oxygen which can be supplied by carrying out the reaction in the presence of air. Alternatively, the oxygen can be supplied in the form of bottled oxygen. Other hydrogen acceptors which can be advantageously utilized in this process are aliphatic ethers containing at least one ethylenic moiety bound to the oxygen atom and having from 3 to 15 carbon atoms such as methyl vinyl ether and cyclic ethers such as dihydropyran.

In converting the compound of Formula V above to the compound of Formula II above, no solvent need be present. Generally, in carrying out this reaction, a temperature of at least 50° C. should be utilized with temperatures of between 80° C. to 200° C., being preferred. If high temperatures are utilized, the reaction may be carried out under superatmospheric pressure.

In accordance with this invention, the compound of Formula I above is synthesized from the compound of Formula II above by means of the following reaction scheme:

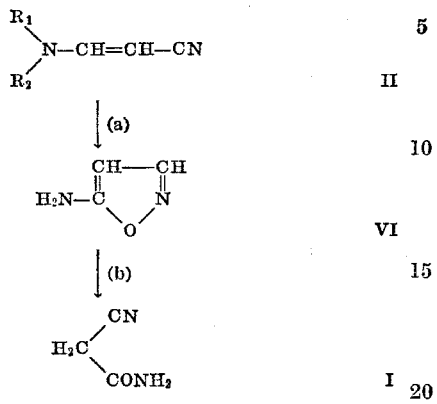

wherein $R_1$ and $R_2$ are as above.

The compound of Formula II above is converted to the compound of Formula VI above, via reaction step (a), by reacting the compound of the Formula II above with an acid addition salt of hydroxylamine. Any conventional acid addition salt of hydroxylamine can be utilized in carrying out this reaction. Among the conventional acid addition salts of hydroxylamine which can be utilized in carrying out this reaction are the hydrohalic acid addition salts, and the sulfuric acid addition salts of hydroxylamine. The preferred acid addition salts of hydroxylamine are the hydrohalic acid salts with the hydrochloride salt being especially preferred. In carrying out the reaction of step (a), the compound of Formula II is reacted in equimolar quantities with the acid addition salt of hydroxylamine. In carrying out this reaction, a molar excess of the compound of Formula II above or the hydroxylamine hydrochloride salt can be present. Generally, this reaction is carried out in the presence of an organic polar solvent. Any conventional polar solvent can be utilized in carrying out this reaction. The preferred class of polar solvents are the aprotic polar solvents with dimethylformamide, dimethylsulfoxide and hexamethylphosphoramide being especially preferred. In carrying out this reaction, temperature and pressure are not critical and this reaction can be carried out at room temperature and atmospheric pressure. Generally, it is preferred to carry out this reaction at a temperature of from about 10° C. to about 90° C.

The compound of Formula VI can be converted to the compound of Formula I above by treatment with a strong acid or base. This acid or base catalyzed isomerization of the compound of Formula VI is carried out with either an alkali metal base or an aqueous inorganic acid. Any conventional alkali metal base such as alkali metal hydroxides or alkali metal lower alkoxides can be utilized in carrying out the reaction of step (b). Generally, the preferred bases are sodium methoxide, sodium hydroxide, etc. However, any conventional alkali metal lower alkoxide such as potassium methoxide, etc.; and alkali metal hydroxides, such as lithium hydroxide, potassium hydroxide, etc., can be utilized. In carrying out the reaction of step (b) with an alkali metal base, an inert organic solvent is utilized. Any conventional inert organic solvent can be utilized in carrying out this reaction. Among the preferred inert organic solvents are included, the lower alkanols such as methanol or ethanol.

The reaction of step (b) can be carried out by utilizing an acid, preferably an aqueous inorganic acid. Any conventional aqueous inorganic acid can be utilized in carrying out this reaction. Among the preferred aqueous inorganic acids are included the hydrohalic acids such as hydrogen chloride, etc., and sulfuric acid. The reaction of step (b) can be carried out in an inert organic solvent or in an aqueous medium. If desired, any conventional inert organic solvent can be utilized in carrying out this reaction. Among the preferred inert organic solvents are included, the lower alkanols such as methanol or ethanol.

In carrying out the acid or base catalyzed isomerization reaction of step (b), temperature and pressure are not critical. The reaction of step (b) can be carried out at room temperature and atmospheric pressure. On the other hand, elevated or reduced temperatures can be utilized. Generally, this reaction is carried out at a temperature of from 0° C. to the reflux temperature of the reaction medium.

In accordance with another embodiment of this invention, malononitrile can be directly prepared from the compound of Formula II above by the following reaction scheme:

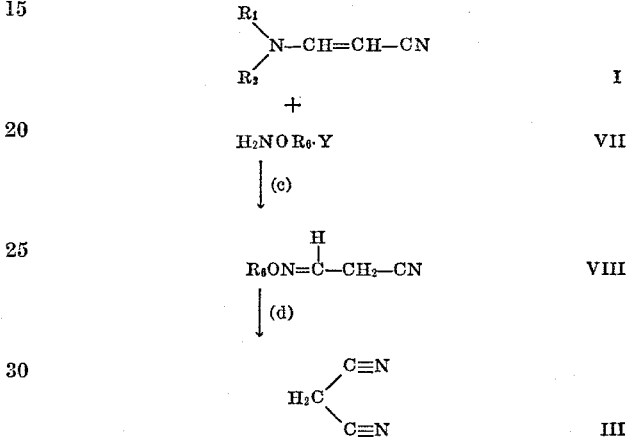

wherein $R_1$ and $R_2$ are as above; $R_6$ is lower alkanoyl; and Y is a mineral acid.

In the first step of this reaction sequence, the compound of Formula I is reacted with a compound of the Formula VII to produce a compound of the Formula VIII. In the salt of the Formula VII above, Y can be any proton donating inorganic acid. Among the preferred inorganic acids which are represented by Y in the salt of Formula VII are included the hydrohalic acids such as hydrochloric, hydrobromic, etc., and sulfuric acid. In carrying out the reaction of step (c), the compound of Formula VII is reacted in equimolar quantities with the compound of Formula I. If desired, a molar excess of the compound of Formula I or the compound of Formula VII can be present in the reaction medium. Generally, this reaction is carried out in the presence of an inert organic solvent. Any conventional inert organic solvent can be utilized in carrying out this reaction. Among the preferred inert organic solvents are the halogenated hydrocarbon solvents such as chloroform, dichloroethane, methylene chloride, carbon tetrachloride, etc. The reaction of compounds of the Formula I with compounds of the Formula VII to produce a compound of the Formula VIII is carried out at a temperature of from 0° C. to 30° C.

The compound of the Formula VIII above is converted to the compound of the Formula III (malonitrile) by heating the compound of the Formula VIII to a temperature of from 70° C. to the reflux temperature of the reaction medium. The reaction of step (d) is carried out in a conventional inert organic solvent. Any conventional inert organic solvent can be utilized to carry out this reaction. Among the preferred inert organic solvents are the halogenated hydrocarbons such as those mentioned hereinbefore. The solvent which is preferred in carrying out the reaction of step (d) is the same solvent in which the compound of the Formula VIII was formed.

In accordance with this invention, the compound of Formula III (malononitrile) can be formed directly from the reaction of the compound of Formula I with the compound of Formula VII without isolating the intermediate of the Formula VIII. This is done by first reacting a compound of the Formula I with a compound of the Formula VII at a temperature of 0° C. to 30° C., preferably room temperature, in an inert organic solvent medium and thereafter heating this reaction medium to a temperature of from 70° C. to reflux to form the compound of the Formula III. In this manner, a simple and direct means is provided for producing the compound of the Formula III directly from the compound of Formula I.

This invention will be more fully understood from the specific examples which follow. These examples are intended to illustrate the invention and are not to be construed as limitative thereof. All temperatures are in degrees centigrade.

Example 1.—Dehydrogenation of dimethylaminopropionitrile to dimethylaminoacrylonitrile The catalytic dehydrogenation of dimethylaminopropionitrile was carried out under the following conditions:

| Hydrogen acceptor | Catalyst | Reaction temperature | Reaction time, hours |
|---|---|---|---|
| Air | 10% Raney nickel | Reflux: about 115° C | 6 |
| Air | 30% CuCr₂O₄ | | 3-24 |
| CH₂=CHOCH₂CH₃ | Palladium on carbon (10%) | 50° C | 24 |
| Dihydropyran | do | Reflux: about 80° C | 24 |
| Do | do | Reflux | 40 |

In the above reaction, a reaction mixture was prepared containing the catalyst and dimethylaminopropionitrile. Where an ether hydrogen acceptor was utilized, the hydrogen acceptor was present in a molar amount of ten times the moles of dimethylaminopropionitrile in the reaction mixture and the reaction was carried out under nitrogen. In the cases where air was used, the reaction was carried out by exposing the reaction mixture to the atmosphere. The catalyst was present in an amount of about 10% by weight or 30% by weight based upon the weight of the dimethylaminopropionitrile as indicated above. The final product obtained was dimethylaminoacrylonitrile. This product distilled at 115° C. at 3 mm. Hg.

Example 2.—Preparation of 3-dimethylaminoacrylonitrile 173.0 g. of the diethylacetal of dimethylformamide (1.18 moles) and 400 ml. of acetonitrile were placed in a 1200 ml. autoclave. Air was removed from the autoclave by flushing with nitrogen, and after purging charged to 50 p.s.i. with nitrogen. The reaction was carried out for 36 hours at 150° C. Upon completion of the reaction, excess acetonitrile was removed by vacuum distillation using a rotary evaporator at a vacuum of 135 mm. Hg and a waterbath temperature of 60° C. maximum. The remaining residue was fractionated using a 24-inch Vigreaux column. After discarding a small first fraction, the material boiling at 115° C. and 3.0 mm. Hg was collected. This material was 3-dimethylaminoacrylonitrile.

Example 3.—Preparation of 5-aminoisoxazole

To a solution of 40 ml. (37.6 g.) of 3-dimethylaminoacrylonitrile in 200 ml. of dimethylformamide (DMF) was added with stirring at room temperature a solution of 30 g. hydroxylamine hydrochloride in 200 ml. DMF. The resulting mixture was heated for 3½ hours at 65–70° and then taken to dryness in high vacuum. The residue was dissolved in 500 ml. of aqueous saturated sodium bicarbonate solution and the solution extracted six times with 500 ml. portions of diethyl ether. The combined extracts were dried over magnesium sulfate, treated with activated charcoal and filtered.

The solvent was removed in vacuo and the residue crystallized from diethyl ether/petroleum ether, affording 19.5 g. of 5-aminoisoxazole as colorless needles, M.P. 77–78.5°. Another 5.1 g. of product, M.P. 75–78° were obtained on concentration of the mother liquor.

Example 4.—Preparation of cyanoacetamide

To a solution of 250 mg. of 5-aminoisoxazole in 10 ml. methanol was added with stirring a solution of 160 mg. of sodium methoxide in 10 ml. of methanol. The resulting mixture was stirred at room temperature for 15 minutes, then acidified with 4 ml. of 1 N hydrochloric acid and evaporated to dryness in vacuo. The residue was dissolved in water and the aqueous solution was extracted with 6× 50 ml. of chloroform. The combined organic extracts were dried over sodium sulfate and evaporated in vacuo. The residue was crystallized from ethanol/diethyl ether/petroleum ether to yield cyanoacetamide, M.P. 112–118°; mixture M.P. with an authentic sample 112–118°.

Example 5.—Preparation of malononitrile

To a solution of 15 ml. of 3-dimethylaminoacrylonitrile in 60 ml. of 1,2-dichloroethane were added in small portions 16.5 g. of O-acetylhydroxylamine hydrochloride. After completed addition, the mixture was stirred at room temperature for 20 minutes. Then the solid precipitate of dimethylamine hydrochloride was filtered off leaving a solution containing cyanoacetaldehyde, O-acetyloxime. The filter cake was washed with a small amount of ethylene chloride. The combined filtrates were heated at reflux temperature for 90 minutes. After removal of the solvent under reduced pressure, the liquid residue was fractionated in vacuo. The desired malononitrile distilled at 71–80° and 1.0–1.2 mm. Hg.

We claim:

1. A compound of the formula

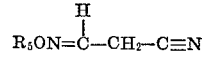

wherein R₅ is lower alkanoyl.

2. The compound of the Formula 1 wherein said compound is cyanoacetaldehyde, O-acetyloxime.

3. A process for producing a compound of the formula:

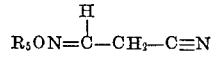

wherein R₅ is a lower alkanoyl comprising reacting a compound of the formula:

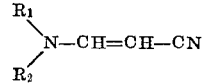

wherein R₁ and R₂ are lower alkyl with a hydrohalic acid or sulfuric acid salt of a compound of the formula:

wherein R₅ is as above; in an inert organic solvent at a temperature of from 0° C. to 30° C.

4. The process of claim 3 wherein the salt is a hydrochloric acid salt.

5. The process of claim 3 wherein the solvent is halogenated hydrocarbon.

References Cited

UNITED STATES PATENTS 2,332,994  7/1967  Marsh _____ 260—465.4
3,483,231  12/1969 Marcus et al. _____ 260—465.4
3,542,848  11/1970 Leimgruber et al. _ 260—465.4 X JOSEPH P. BRUST, Primary Examiner U.S. Cl. X.R.

260—307 H, 465.5 R, 465.8 R